E. F. WHITE.
ELECTRIC GENERATOR.
APPLICATION FILED SEPT. 12, 1908.
930,819.
Patented Aug. 10, 1909.
2 SHEETS—SHEET 1.
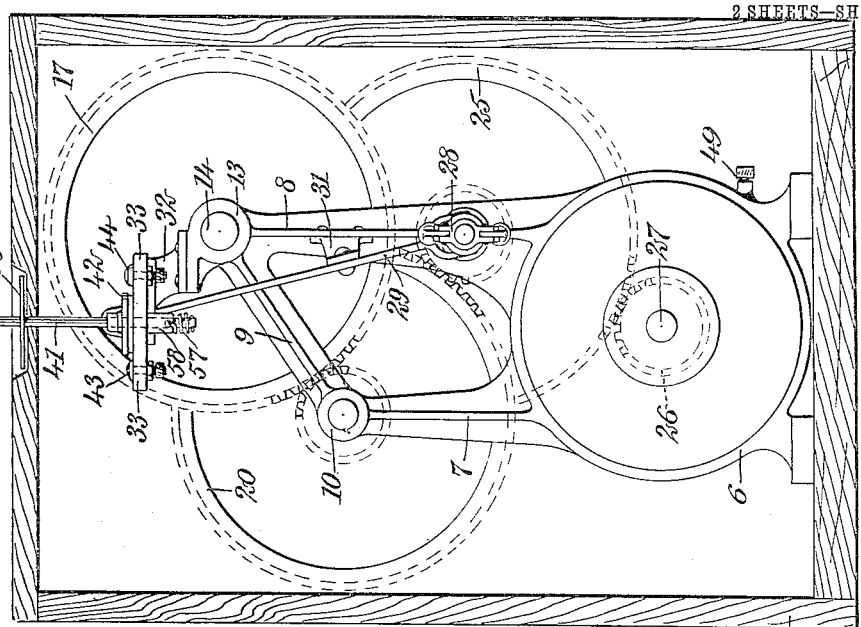
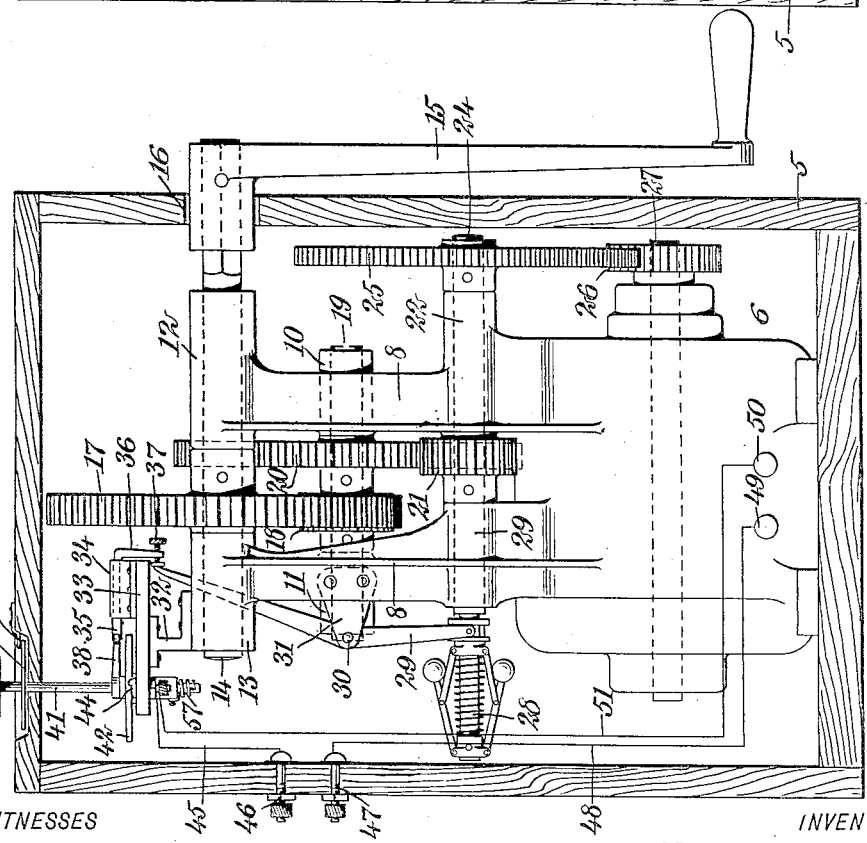
WITNESSES
INVENTOR
Edward Frank White
BY
ATTORNEYS E. F. WHITE.
ELECTRIC GENERATOR.
APPLICATION FILED SEPT. 12, 1908.
930,819.
Patented Aug. 10, 1909.
2 SHEETS—SHEET 2.
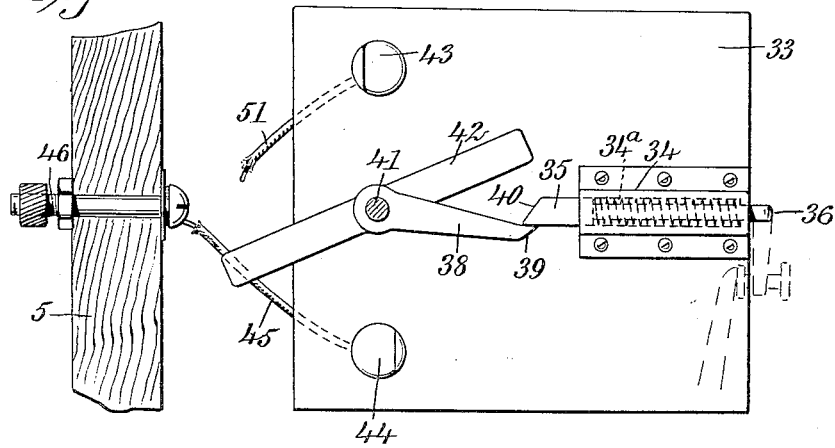
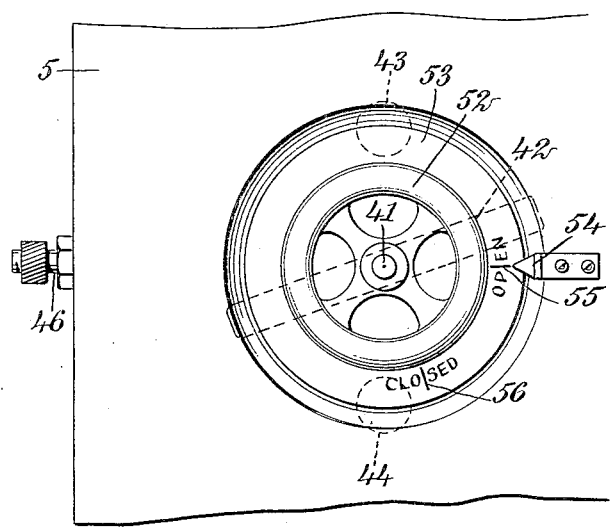
WITNESSES
INVENTOR
Edward Frank White
BY
ATTORNEYS

UNITED STATES PATENT OFFICE.

EDWARD FRANK WHITE, OF SPOKANE, WASHINGTON.

ELECTRIC GENERATOR.

No. 930,819.  Specification of Letters Patent.  Patented Aug. 10, 1909.

Application filed September 12, 1908. Serial No. 452,692.

*To all whom it may concern:*

Be it known that I, EDWARD FRANK WHITE, a citizen of the United States, and a resident of Spokane, in the county of Spokane and State of Washington, have invented a new and Improved Electric Generator, of which the following is a full, clear, and exact description.

My invention relates to electric generators of the portable manually-operated type, my more particular purpose being to provide an improved form of such generator especially suitable for blasting and having a high degree of efficiency combined with great mechanical strength.

My invention further relates to provision whereby the firing circuit is always closed abruptly at the precise moment when the voltage of the machine is sufficiently high to operate any desired number of exploders.

My invention comprehends the addition to a generator of this character of switch mechanism to be set by hand at will, and to be thrown by the automatic action of the machine, for the purpose of suddenly closing the circuit at the precise instant when the voltage is most effective.

My invention comprises, in addition, certain desirable advantages in the framework of the machine and in the mountings for various other parts.

Reference is to be had to the accompanying drawings forming a part of this specification, in which similar characters of reference indicate corresponding parts in all the figures.

Figure 1 is a front elevation of the machine, this view (a wall of the casing being removed) showing the generator, the crank and gearing for actuating the same, the speed-controlled governor and the electric switch operated directly by the governor for the purpose of suddenly closing the circuit when the generator attains a predetermined speed; Fig. 2 is a side elevation of the mechanism (a wall of the casing being removed), the view being taken from the left of Fig. 1; Fig. 3 is an enlarged fragmentary view of the electric switch for abruptly closing the circuit; and Fig. 4 is an enlarged plan view of the hand wheel for operating the switch, and the indicating mechanism for showing to the operator whether the switch is opened or closed.

A casing is shown at 5 and mounted within it is a generator 6, which may be either direct or alternating and may be wound series, shunt or compound, as desired. Extending upwardly from this generator and cast integral with the casing thereof, are arms 7, 8 which are connected together by arms 9 integral with them. Mounted upon the arms 7 are bearings 10, 11, while the arms 8 support larger bearings 12, 13, the bearings in all instances being integral with the arms which support them.

A revoluble shaft 14 extends through the bearings 12, 13. Mounted upon one end of this shaft is a hand crank 15, to accommodate which an aperture 16 is made in the casing. Keyed upon the shaft 14 is a gear wheel 17, and this meshes with a gear pinion 18, similarly keyed upon a revoluble shaft 19 supported by the bearings 10, 11. Keyed upon the shaft 19 is a gear wheel 20 which meshes with a gear pinion 21. Bearings 23, 23 integral with the arms 8, support a revoluble shaft 24 upon which the gear pinion 21 is keyed. A gear 25 is secured rigidly upon the shaft 24 and meshes with a gear pinion 26, mounted rigidly upon the armature shaft 27 of the generator 6.

At 28 is a speed-controlled governor, of suitable type. Connected with this governor and actuated by it is a lever 29, which is mounted upon a pivot 30, the latter being supported upon a bracket 31. Another bracket 32 is mounted upon the bearing 13 and extends upwardly from the same. A shelf 33 is supported by the bracket 32, and mounted upon this shelf is a latch holder 34. Extending through this holder is a bolt 35 provided with a downwardly extending portion 36 which carries an adjustable screw 37. The upper end of the lever 29 is adapted to engage the screw 37.

Disposed adjacent to the bolt 35 is an arm 38 provided at its outer or free end with a bevel face 39, as will be understood from Fig. 3. The bolt 35 is also provided with a bevel face 40. Mounted within the latch holder 34 is a spiral spring 34$^a$ which engages the bolt 35 and tends to force the same toward the left according to Fig. 3.

A rocking shaft 41 extends through the shelf 33 and through the top of the casing, being thus journaled in position. Mounted rigidly upon this rocking shaft 41 is a contact lever 42, and disposed partially within the path of the same are contact buttons 43, 44, so disposed that the contact lever 42 connects them together when rocked to the left or in a contraclockwise direction, according to Fig. 3.

From the contact button 44 a wire 45 leads to a binding post 46. Another binding post is shown at 47. These two binding posts are used in making connection to the exploders. From the binding post 47 a wire 48 leads downwardly to a binding post 49 of the generator 6. The generator is provided with a binding post 50 to which is connected another wire 51, the latter leading to the contact button 43.

Mounted upon the upper end of the rocking shaft 41 is a hand wheel 52. Disposed below this hand wheel is a plate 53, and overhanging the same slightly is a fixed pointer 54 mounted upon the casing. The plate 53 is provided with indicating marks 55, 56 which refer to the positions shown by the legends in Fig. 4, as opened and closed. That is to say, when the parts are in the position indicated by Fig. 4, the electric switch shown in Fig. 3 is open; that is, the contact bar 42 does not now connect together the contact buttons 43, 44. If, however, the hand wheel 52 be turned so that the marks 56 of the legend "Closed" are brought adjacent to the point 54, the switch shown in Fig. 4 becomes closed; that is, the contact bar 42 will now connect together the contact buttons 43, 44.

A spiral spring 57 (see Fig. 2) is connected with a sleeve 58 encircling the shaft 41 and rigid with the shelf 33. The shaft 41 is connected directly with the opposite end of this spring. The purpose of the spring 57 is to turn the rocking shaft 41 in a contraclockwise direction, according to Figs. 3 and 4, whenever the arm 38 is released from the latch 35. This spring 57 also serves the purpose of insuring good contact between the contact bar 42 and the contact buttons 43, 44, when said buttons are engaged by the contact bar.

The operation of my device is as follows: If, for any reason, the operator desires to have the machine work on closed circuit, and it should happen that he finds the latch 45 and arm 38 in the positions indicated by Fig. 3, he merely moves the latch 35 to the right according to this figure. The spiral spring 57 thereupon turns the shaft 41, as just described, and causes the contact lever 42 to engage the contact buttons 43, 44. The machine may now be operated by turning the crank 15, the circuit being as follows: generator 6, binding post 49, wire 48, binding post 47 to external circuit (not shown), thence returning, binding post 46, wire 45, contact button 44, contact lever 42, contact button 43, wire 51, binding post 50, and generator 6. In ordinary use, however, the machine is not operated upon closed circuit. The circuit is generally left open at the start, but is closed while the machine is running and when the voltage is sufficiently high to cause an explosion. Suppose, now, that the operator desires to fire one or more exploders used, for instance, in blasting. The proper wires being connected with the binding posts 46, 47, and with the exploders, the operator next grasps the hand wheel 52 and turns the rocking shaft 41 in a clockwise direction according to Figs. 3 and 4. As the arm 38 turns with the shaft, the bevel face 39 of this arm engages the bevel face 40 of the latch 35 so that this latch is pushed a little to the right according to Fig. 3, the spring 34ª being slightly compressed. The arm 38 now rests against the latch 35 so that the contact lever 42 is held in the position indicated in Figs. 3 and 4. The operator next grasps the handle of the machine and turns it quite rapidly. Motion is transmitted through the various gears and shafts down to the armature shaft 27, and current is thus generated, the voltage rising as the handle is turned with greater rapidity. Finally, when the speed becomes comparatively high, and consequently the current acquires a predetermined high voltage, the speed of the governor 28 causes the lever 29 to be rocked and this movement of the lever moves the latch 35 to the right according to the views shown in Figs. 1, 3 and 4. The movement of the latch 35 to the right disengages the arm 38 and the result is that the bar 42 immediately rocks in a contraclockwise direction, as above indicated, and suddenly engages, and therefore also connects together, the contact buttons 43, 44, completing the following circuit: generator 6, binding post 49, wire 48, binding post 47 (external circuit to exploders), binding post 46, wire 45, contact button 44, contact lever 42, contact button 43, wire 51, binding post 50, to generator 6. The high potential current being thus passed through the exploders causes them to fire.

I call special attention to the compact arrangement of the various mountings for supporting the revoluble shafts and the gear wheels carried by them. The arms 7, 8, with the various bearings integral with them, constitute a very rigid framework which will not easily get out of order.

In practice the operator merely turns the hand wheel 52 to set the latch 35, as indicated in Fig. 3. In order to ascertain whether the switch is opened or closed, all the operator has to do is to glance at the plate 53, as indicated in Fig. 4, and in doing this to note the position of the legends "Open" and "Closed", relatively to the pointer 54.

Having thus described my invention, I claim as new and desire to secure by Letters Patent:

1. The combination of a generator, a metallic arm mounted upon said generator and provided with bearings integral with said arm, other arms mounted directly upon said generator, longitudinal strengthening members extending from said first-mentioned arm to said last-mentioned arms, said longitudinal strengthening members being so disposed that strains received thereby are directed longitudinally thereof, and gear members journaled within said bearings and connected with said generator for actuating the same.

2. The combination of a generator, a switch comprising a plurality of contact points, a contact lever for connecting said points together, a shaft supporting said lever and adapted to turn so as to bring said lever into engagement with said contact members, an arm mounted rigidly upon said shaft for the purpose of temporarily restraining said contact lever, means for turning said contact lever whenever the same is free, a latch disposed partially within the path of said arm for the purpose of temporarily holding the latter, a speed-controlled governor, mechanism connecting said speed-controlled governor with said latch for the purpose of enabling said speed-controlled governor to withdraw said latch from the path of said arm, thereby enabling said switch to close, and connections from said speed-controlled governor to said generator for actuating said speed-controlled governor.

In testimony whereof I have signed my name to this specification in the presence of two subscribing witnesses.

EDWARD FRANK WHITE.

Witnesses:
S. W. BLAURACK,
E. M. BROWN.